G. M. WEBSTER.
SPROCKET GEARING.
APPLICATION FILED OCT. 4, 1912.

1,056,240.

Patented Mar. 18, 1913.

WITNESSES

INVENTOR
G. M. Webster

UNITED STATES PATENT OFFICE.

GEORGE M. WEBSTER, OF FORT DODGE, IOWA.

SPROCKET-GEARING.

1,056,240.

Specification of Letters Patent.  Patented Mar. 18, 1913.

Application filed October 4, 1912. Serial No. 723,919.

*To all whom it may concern:*

Be it known that I, GEORGE M. WEBSTER, a citizen of the United States, residing at Fort Dodge, in the county of Webster and State of Iowa, have invented certain new and useful Improvements in Sprocket-Gearing, of which the following is a specification.

My invention relates to improvements in sprocket gearing, and is devised particularly for the purpose of transmitting motion from a driving member to a driven member, each of said members being provided with a sprocket chain. In the particular case illustrated, each sprocket chain is equipped with an endless canvas belt passing about a roller, as fully set forth in my pending application for Patent No. 713,109 filed Sept. 5, 1912, for seed cleaners.

The invention consists in certain novel features of construction and combinations and arrangements of parts, as hereinafter set forth and claimed.

In the accompanying drawings I have illustrated one complete example of the physical embodiment of my invention constructed according to the best mode I have so far devised for the practical application of the principles of the invention.

Figure 1:
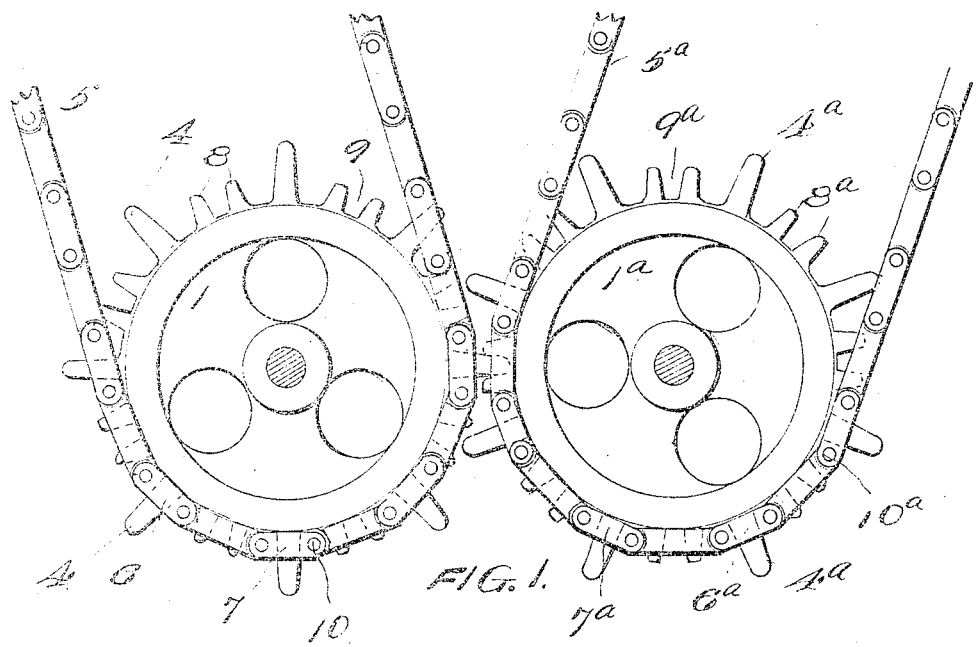
Figure 2:
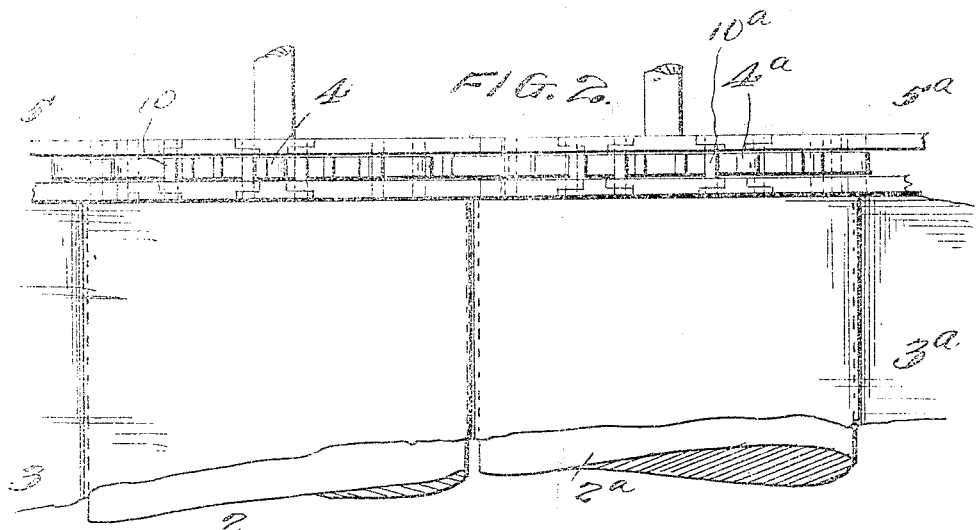

Figure 1 is a side elevation of the gearing. Fig. 2 is a view looking up from the bottom, and showing one end of a pair of rollers with belts passing thereover.

In the preferred embodiment of my invention I have illustrated two combined sprocket and gear wheels as 1 and $1^a$, and these wheels are adapted to rotate the rollers 2 and $2^a$ over which the canvas belts 3 and $3^a$ pass. While I have illustrated the gearing applied to rollers and belts, it will of course be understood that I contemplate using my gearing in other relations and upon other suitable structures or machines where applicable.

Each of the sprocket-gear wheels is provided with sprocket teeth 4, $4^a$ to accommodate the chains 5, $5^a$. The links are similar throughout the chains, but for convenience of description I shall designate them as 6, $6^a$ of the respective chains fitting over the sprocket teeth, 4, $4^a$, and links 7, $7^a$, fitting over the double teeth 8, $8^a$ between which the sockets 9, $9^a$ are formed for the reception of the teeth 4, $4^a$. The pins 10, $10^a$ hold the chains together and complete the links which pass over the teeth of the wheels.

The arrows indicate the direction of movement of the wheels, and it is assumed that the wheel 1 is the driving wheel, receiving power from a suitable source not shown, and transmitting power to the driven wheel 2 direct, and through the sprocket chains these wheels transmit the power to a second pair of sprocket wheels.

From the above description taken in connection with the drawings, it is evident that I have provided an efficient and economical combination of elements for the transmission of power as described.

Having thus fully described my invention, what I claim as new and desire to secure by Letters Patent is:—

The combination of a pair of wheels each having a series of long teeth, and a series of shorter teeth forming sockets alternating with the long teeth for the reception of the long teeth on the opposite wheel, a chain on each wheel passing over the long teeth as sprockets, and the long teeth passing through the chain when engaging the complementary sockets.

In testimony whereof I affix my signature in presence of two witnesses.

GEORGE M. WEBSTER.

Witnesses:
JOHN J. BESTICK,
FRANK C. KOLL.